US012558707B2

(12) United States Patent
Chiu et al.

(10) Patent No.: US 12,558,707 B2
(45) Date of Patent: Feb. 24, 2026

(54) TRANSDUCER AND MANUFACTURING METHOD THEREOF

(71) Applicant: AUO Corporation, Hsinchu (TW)

(72) Inventors: Pin-Hsiang Chiu, Hsinchu (TW); Tai-Hsiang Huang, Hsinchu (TW); Zheng-Han Chen, Hsinchu (TW); Ming Xuan Zhang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 269 days.

(21) Appl. No.: 18/357,180

(22) Filed: Jul. 24, 2023

(65) Prior Publication Data

US 2024/0399418 A1 Dec. 5, 2024

(30) Foreign Application Priority Data

May 29, 2023 (TW) ................................. 112119938

(51) Int. Cl.
*B06B 1/02* (2006.01)

(52) U.S. Cl.
CPC ................................. *B06B 1/0292* (2013.01)

(58) Field of Classification Search
CPC ................................ B06B 1/02; B06B 1/0272
USPC .......................................................... 310/309
See application file for complete search history.

(56) References Cited

U.S. PATENT DOCUMENTS 7,545,075 B2 6/2009 Huang et al.
7,944,114 B2 * 5/2011 Yoshimura ............ B06B 1/0292 367/181
9,505,030 B2 * 11/2016 Rothberg ............ H01L 23/5226
2006/0075818 A1 * 4/2006 Huang .................. B06B 1/0292 73/649
2012/0299439 A1 * 11/2012 Huang .................. B06B 1/0292 310/309
2013/0000116 A1 * 1/2013 Zaitsu ................... B06B 1/0292 29/846
2013/0286786 A1 * 10/2013 Yoshida .................... B06B 1/02 367/140
2021/0151525 A1 * 5/2021 Li ........................ H10K 59/124
2025/0153220 A1 * 5/2025 Jiang ..................... B06B 1/0662

FOREIGN PATENT DOCUMENTS

CN 105540528 5/2016
CN 113145432 A * 7/2021 ........... B06B 1/0688
TW I714516 12/2020

OTHER PUBLICATIONS

CN-113145432-A translation (Year: 2021).*

* cited by examiner

*Primary Examiner* — Oluseye Iwarere
*Assistant Examiner* — Nicholas Lee Setzer
(74) *Attorney, Agent, or Firm* — JCIPRNET

(57) ABSTRACT

A transducer includes a substrate, a lower electrode, an insulating layer, an oscillating membrane, and an upper electrode. The substrate has a cave and an island-shaped protrusion defining the cave. The lower electrode is disposed in the cave and on the island-shaped protrusion of the substrate. The insulating layer is disposed on the lower electrode. The oscillating membrane includes a contact portion and an oscillating portion. The contact portion is in contact with the insulating layer and is located between the oscillating portion and the insulating layer. A cavity is located between the oscillating portion and the cave of the substrate. The upper electrode is disposed on the oscillating membrane. Moreover, a manufacturing method of the transducer is also provided.

6 Claims, 10 Drawing Sheets

TRANSDUCER AND MANUFACTURING METHOD THEREOF

CROSS-REFERENCE TO RELATED APPLICATION

This application claims the priority benefit of Taiwan application serial no. 112119938, filed on May 29, 2023. The entirety of the above-mentioned patent application is hereby incorporated by reference herein and made a part of this specification.

BACKGROUND

Technical Field

The disclosure relates to a transducer and a manufacturing method thereof.

Description of Related Art

Ultrasonic transducers include bulk piezoelectric ceramic transducers, capacitive micromachined ultrasonic transducers, and piezoelectric micromachined ultrasonic transducers. In recent years, many manufacturers and research institutes have invested in the development of capacitive micromachined ultrasonic transducers. This technology utilizes semiconductor processes to miniaturize the volume of the ultrasonic transducers, making it easier to integrate into various products compared to traditional bulk piezoelectric materials.

A capacitive micromachined ultrasonic transducer includes a lower electrode, an oscillating membrane located above the lower electrode, and an upper electrode located on the oscillating membrane. There is a cavity between the lower electrode and the oscillating membrane. By applying an electric field between the lower electrode and the upper electrode, the oscillating membrane may vibrate within the cavity, thereby generating ultrasonic waves.

The capacitive micromachined ultrasonic transducer may operate in the regular mode or the collapse mode. In the regular mode, the capacitive micromachined ultrasonic transducer has controlling stability (linear operation) and low mechanical coupling efficiency (low sound pressure and bandwidth). However, the adjustable frequency range is relatively narrow. In the collapse mode, the capacitive micromachined ultrasonic transducer offers high coupling efficiency (high sound pressure/bandwidth/sensitivity) and flexible design options (wide frequency range_variable frequency). The problem, however, lies in the fact that the capacitive micromachined ultrasonic transducers operating in the collapse mode consumes excessive energy.

SUMMARY

The disclosure provides a transducer with the advantage of low power consumption.

The transducer of the disclosure includes a substrate, a lower electrode, an insulating layer, an oscillating membrane, and an upper electrode. The substrate has a cave and an island-shaped protrusion defining the cave. The lower electrode is disposed in the cave and on the island-shaped protrusion of the substrate. The insulating layer is disposed on the lower electrode. The oscillating membrane includes a contact portion and an oscillating portion. The contact portion is in contact with the insulating layer and is located between the oscillating portion and the insulating layer. A cavity is located between the oscillating portion and the cave of the substrate. The upper electrode is disposed on the oscillating membrane.

The manufacturing method for the transducer of the disclosure is described below. A first conductive layer is formed on a substrate. The substrate has a cave and an island-shaped protrusion defining the cave. The first conductive layer includes a lower electrode. The lower electrode is disposed in the cave and on the island-shaped protrusion of the substrate. An insulating layer is formed on the first conductive layer. A sacrificial material layer is formed on the insulating layer. The sacrificial material layer includes a sacrificial block disposed above the lower electrode. The sacrificial block has a through hole. The through hole of the sacrificial block overlaps the island-shaped protrusion of the substrate. An oscillating material membrane is formed for covering the sacrificial material layer. A portion of the oscillating material membrane is filled into the through hole of the sacrificial block and is in contact with the insulating layer. A second conductive layer is formed on the oscillating material membrane. The second conductive layer includes an upper electrode. Multiple through holes are formed in the oscillating material membrane so that the oscillating material membrane forms an oscillating membrane. The through holes of the oscillating membrane respectively expose several regions of the sacrificial block. An etchant is caused to enter the through holes of the oscillating membrane for removing the sacrificial block. An encapsulation layer is formed on the oscillating membrane. The encapsulation layer includes multiple sealing portions. The sealing portions are respectively disposed in the through holes of the oscillating membrane and extend to the insulating layer.

DESCRIPTION OF THE EMBODIMENTS

Figure 1A:
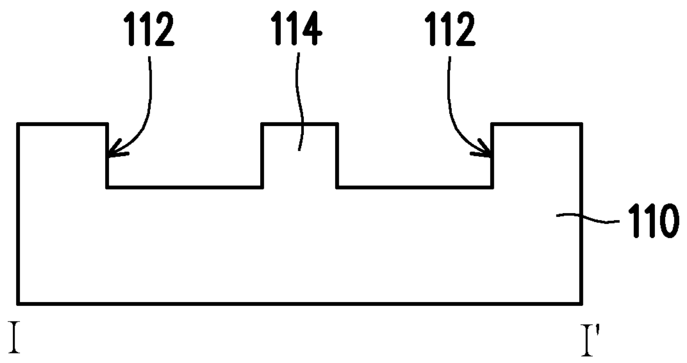
FIG. 1A to FIG. 1I are cross-sectional schematic views of a manufacturing flow of a transducer according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

It should be understood that when an element such as a layer, a film, an area, or a substrate is indicated to be "on" another element or "connected to" another element, it may be directly on another element or connected to another element, or an element in the middle may exist. In contrast, when an element is indicated to be "directly on another element" or "directly connected to" another element, an element in the middle does not exist. As used herein, "to connect" may indicate to physically and/or electrically connect. Furthermore, "to electrically connect" or "to couple" may also be used when other elements exist between two elements.

The usages of "approximately", "similar to", or "substantially" indicated throughout the specification include the indicated value and an average value having an acceptable deviation range, which is a certain value confirmed by people skilled in the art, and is a certain amount considered the discussed measurement and measurement-related deviation (that is, the limitation of measurement system). For example, "approximately" may indicate to be within one or more standard deviations of the indicated value, or being within ±30%, ±20%, ±10%, ±5%. Furthermore, the usages of "approximately", "similar to", or "substantially" indicated throughout the specification may refer to a more acceptable deviation scope or standard deviation depending on optical properties, etching properties, or other properties, and all properties may not be applied with one standard deviation.

Unless otherwise defined, all terms (including technical and scientific terms) used herein have the same meaning as that commonly understood by one of ordinary skill in the art to which this disclosure belongs. It should be further understood that terms such as those defined in commonly used dictionaries should be construed as having meanings consistent with their meanings in the context of the related art and the disclosure, and are not to be construed as idealized or excessive formal meaning, unless expressly defined as such herein.

FIG. 1A to FIG. 1I are cross-sectional schematic views of a manufacturing flow of a transducer according to an embodiment of the disclosure. FIG. 2A to FIG. 2I are top perspective schematic views of a manufacturing flow of a transducer according to an embodiment of the disclosure. FIG. 1A to FIG. 1I correspond to the profile line I-I' of FIG. 2A to FIG. 2I. FIG. 1A to FIG. 1I and FIG. 2A to FIG. 2I depict a manufacturing flow of a transducer structure U of a transducer 10 as an example.

Figure 2A:
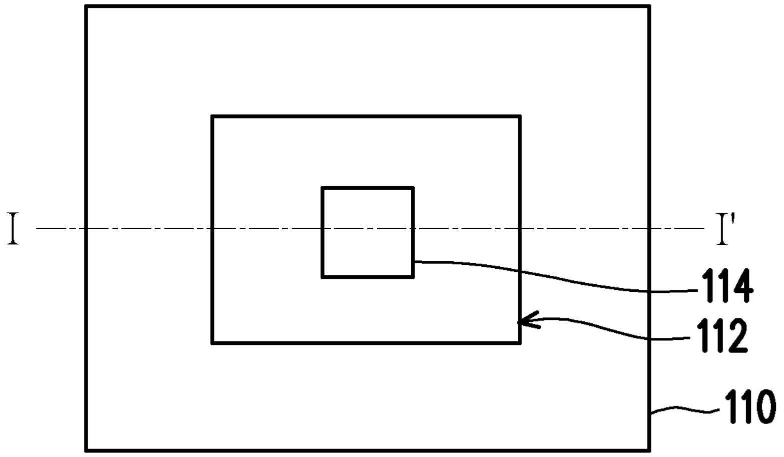
FIG. 2A to FIG. 2I are top perspective schematic views of a manufacturing flow of a transducer according to an embodiment of the disclosure.

Refer to FIG. 1A and FIG. 2A, firstly, a substrate 110 is provided. The substrate 110 has a cave 112 and an island-shaped protrusion 114 defining the cave 112. In one embodiment, the cave 112 may be a closed ring and surround the island-shaped protrusion 114. In one embodiment, the material of the substrate 110 is, for example, glass. However, the disclosure is not limited thereto. In other embodiments, the material of the substrate 110 may also be quartz, organic polymer, or other suitable materials.

Figure 1B:
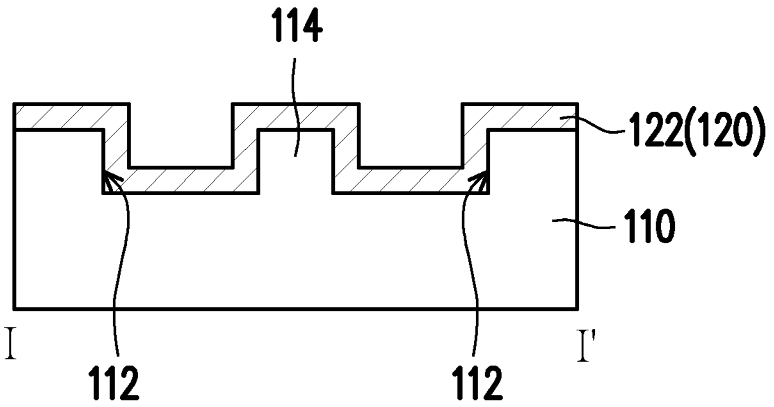
Figure 2B:
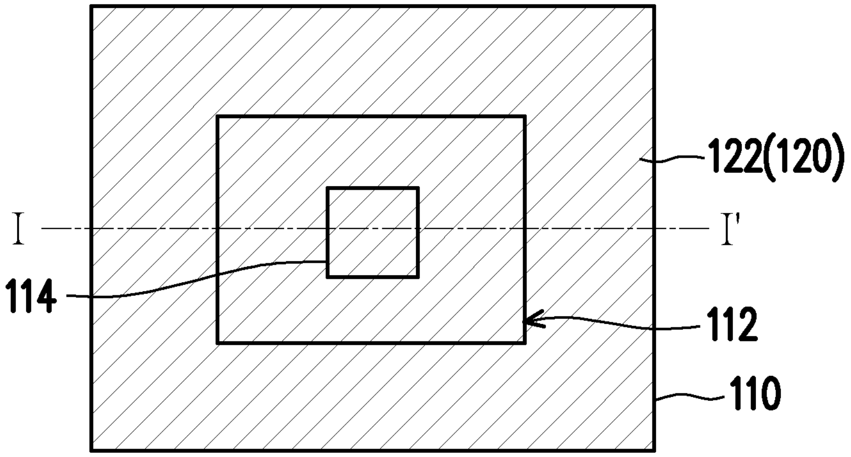

Referring to FIG. 1B and FIG. 2B, then, a first conductive layer 120 is formed on the substrate 110. The first conductive layer 120 includes a lower electrode 122. In this embodiment, the first conductive layer 120 may optionally cover the substrate 110 entirely. The lower electrode 122 may be one region of the first conductive layer 120, but the disclosure is not limited thereto. In one embodiment, the first conductive layer 120 includes, for example, a stacked layer of titanium/aluminum/titanium (Ti/Al/Ti). However, the disclosure is not limited thereto. In other embodiments, the first conductive layer 120 may also include other kinds of conductive materials. In addition, the disclosure does not limit the first conductive layer 120 to necessarily include a stacked layer of multiple conductive materials. In other embodiments, the first conductive layer 120 may also include a single type of conductive material.

Figure 1C:
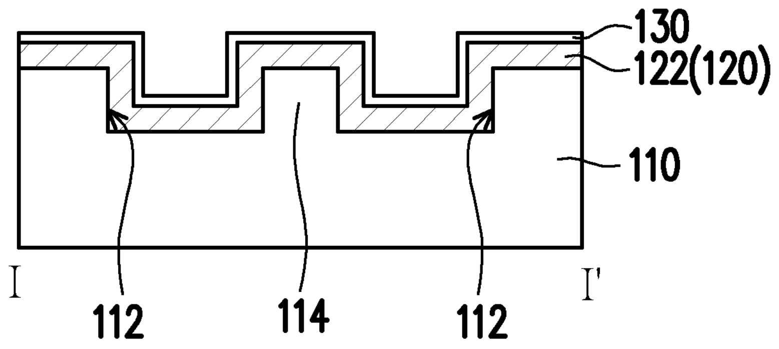
Figure 2C:
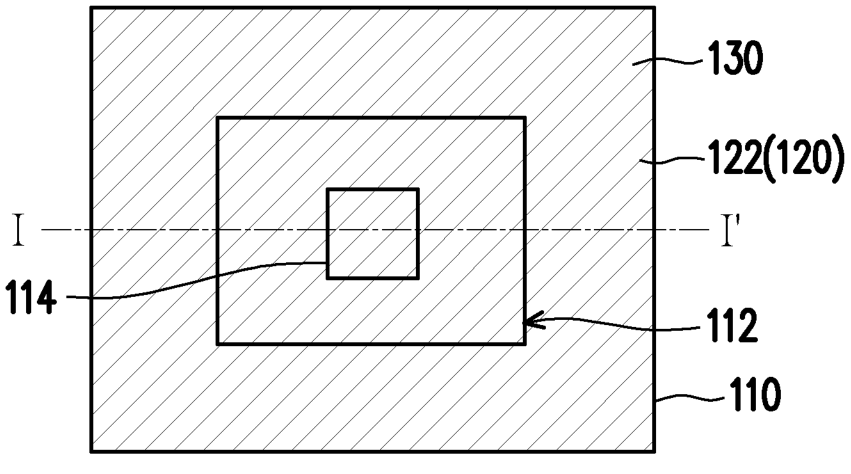

Referring to FIG. 1C and FIG. 2C, and then, an insulating layer 130 is formed on the first conductive layer 120. In this embodiment, the insulating layer 130 may optionally cover the first conductive layer 120 entirely, but the disclosure is not limited thereto. In one embodiment, the material of the insulating layer 130 may be an inorganic material (e.g., silicon nitride, silicon oxide, silicon oxynitride, or a stacked layer of at least two of the above materials), an organic material, or a combination of the above.

Figure 1D:
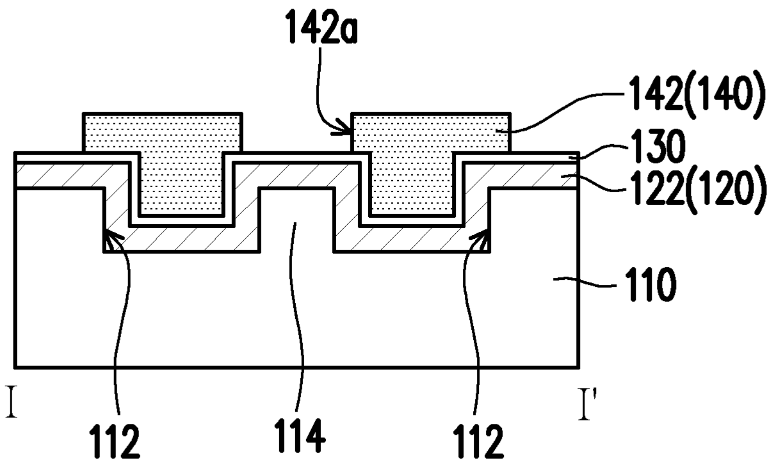
Figure 2D:
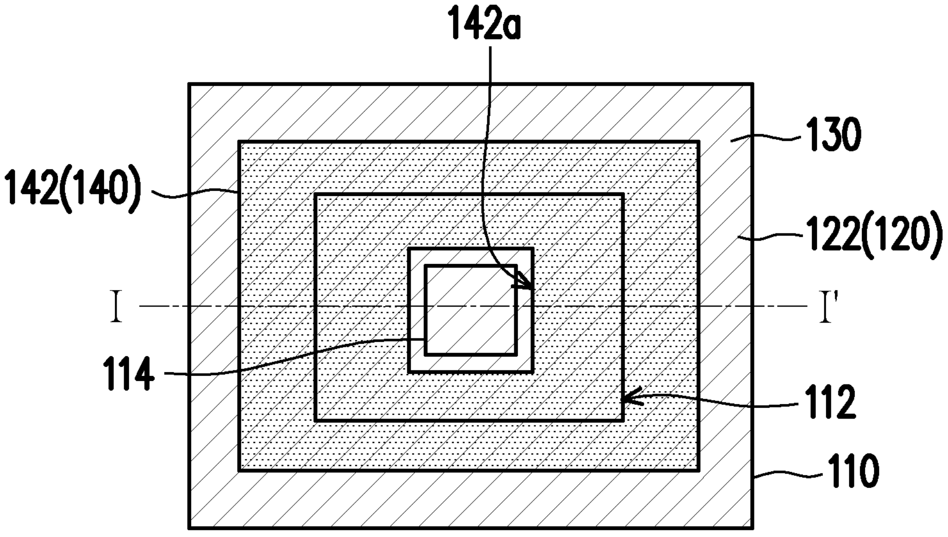

Referring to FIG. 1D and FIG. 2D, next, a sacrificial material layer 140 is formed on the insulating layer 130. The sacrificial material layer 140 includes a sacrificial block 142 disposed above the lower electrode 122. Specifically, the sacrificial block 142 has a through hole 142*a*. The through hole 142*a* of the sacrificial block 142 overlaps the island-shaped protrusion 114 of the substrate 110. In one embodiment, the island-shaped protrusion 114 may fall within the vertical projection of the through hole 142*a* of the sacrificial block 142 on the substrate 110, but the disclosure is not limited thereto. For example, in one embodiment, the material of the sacrificial material layer 140 may be molybdenum (Mo). However, the disclosure is not limited thereto. In other embodiments, the material of the sacrificial material layer 140 may also be other types of material.

Figure 1E:
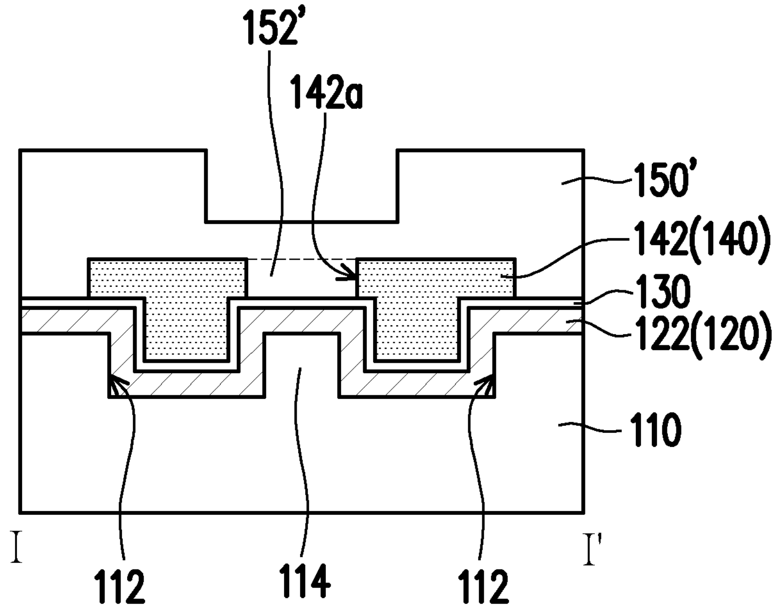
Figure 2E:
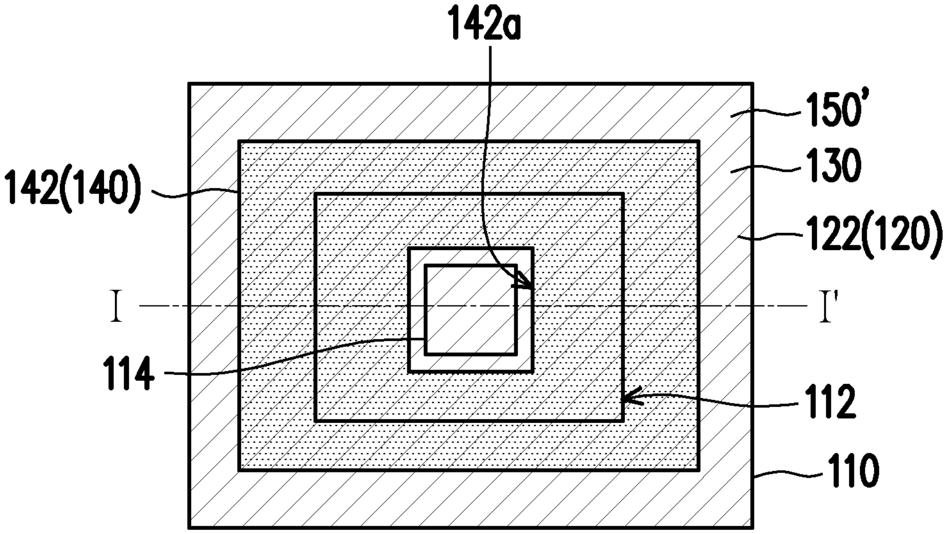

Referring to FIG. 1E and FIG. 2E, and then, an oscillating material membrane 150' is formed for covering the sacrificial material layer 140. A portion 152' of the oscillating material membrane 150' is filled into the through hole 142*a* of the sacrificial block 142 and is in contact with the insulating layer 130. In one embodiment, the material of the oscillating material membrane 150' may be an inorganic material (e.g., silicon nitride, silicon oxide, silicon oxynitride, or a stacked layer of at least two of the above materials), an organic material, or a combination of the above.

Figure 1F:
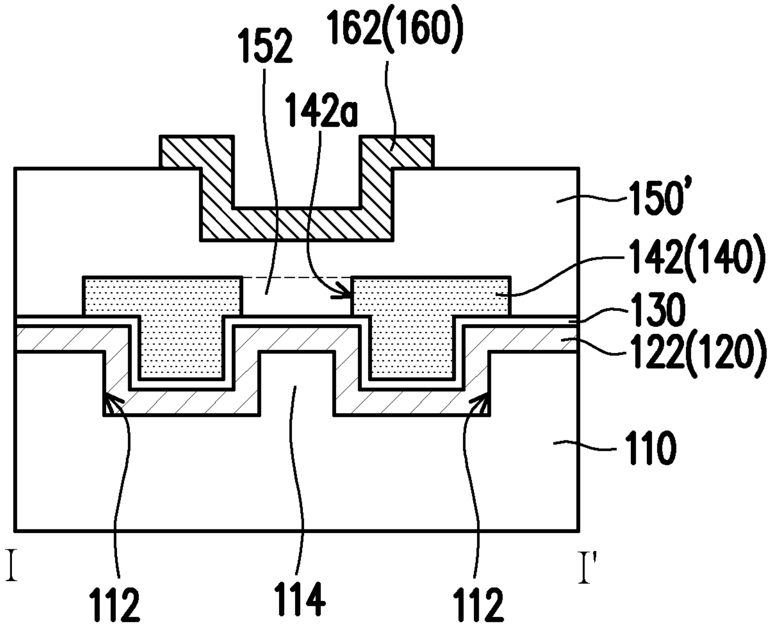
Figure 2F:
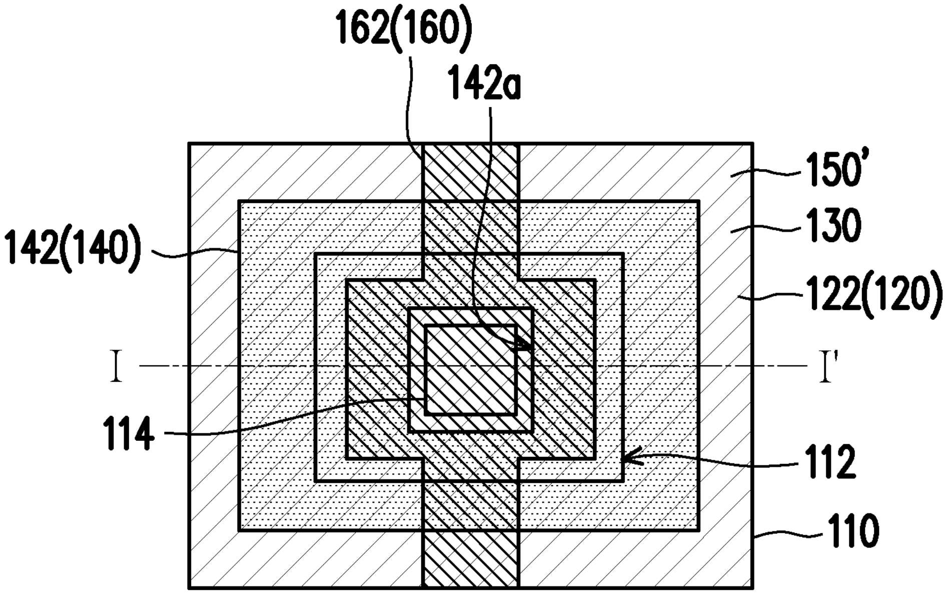
Figure 2G:
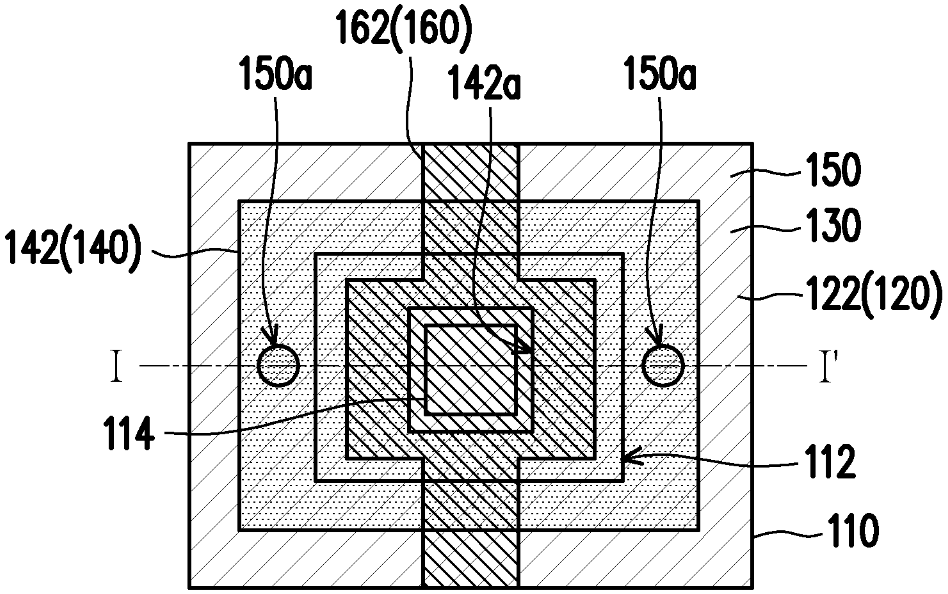
Figure 2H:
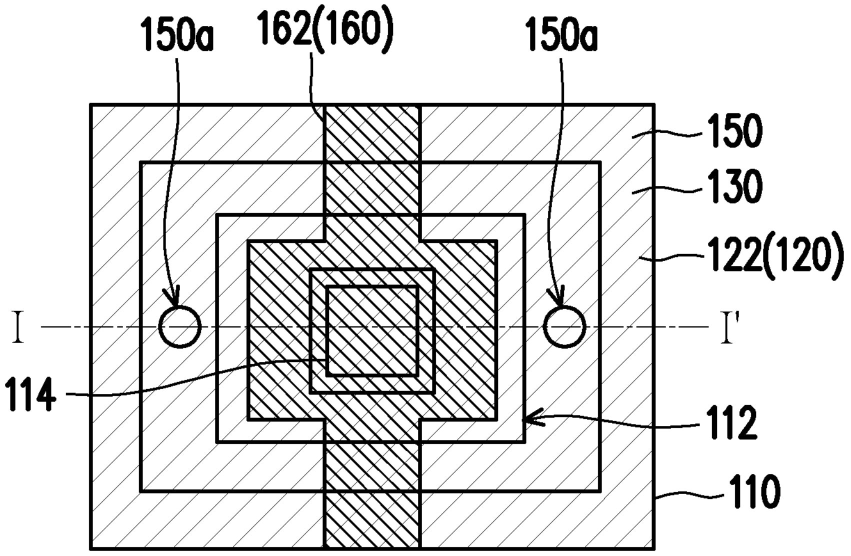

Referring to FIG. 1F and FIG. 2F, then, a second conductive layer 160 is formed on the oscillating material membrane 150'. The second conductive layer 160 includes an upper electrode 162. The upper electrode 162 is located above the sacrificial block 142. For example, in one embodiment, the second conductive layer 160 includes a stacked layer of molybdenum/aluminum/molybdenum (Mo/Al/Mo). However, the disclosure is not limited thereto. In other embodiments, the second conductive layer 160 may also include other kinds of conductive materials. In addition, the disclosure does not limit the second conductive layer 160 to necessarily include a stacked layer of multiple conductive materials. In other embodiments, the second conductive layer 160 may also include a single type of conductive material.

Referring to FIG. 1F, FIG. 1G, FIG. 2F, and FIG. 2G, afterwards, Multiple through holes 150*a* are formed in the oscillating material membrane 150' so that the oscillating material membrane 150' forms an oscillating membrane 150. The through holes 150*a* of the oscillating membrane 150 respectively expose several regions of the sacrificial block 142. The oscillating material membrane 150' is filled into the through hole 142*a* of the sacrificial block 142, and a portion 152' in contact with the insulating layer 130 forms a contact portion 152 of the oscillating membrane 150. The contact portion 152 of the oscillating membrane 150 is in contact with the insulating layer 130.

Referring to FIG. 1G, FIG. 1H, FIG. 2G, and FIG. 2H, and then, an etchant EL is caused to enter the through holes 150*a* of the oscillating membrane 150 for removing the sacrificial block 142.

Figure 1G:
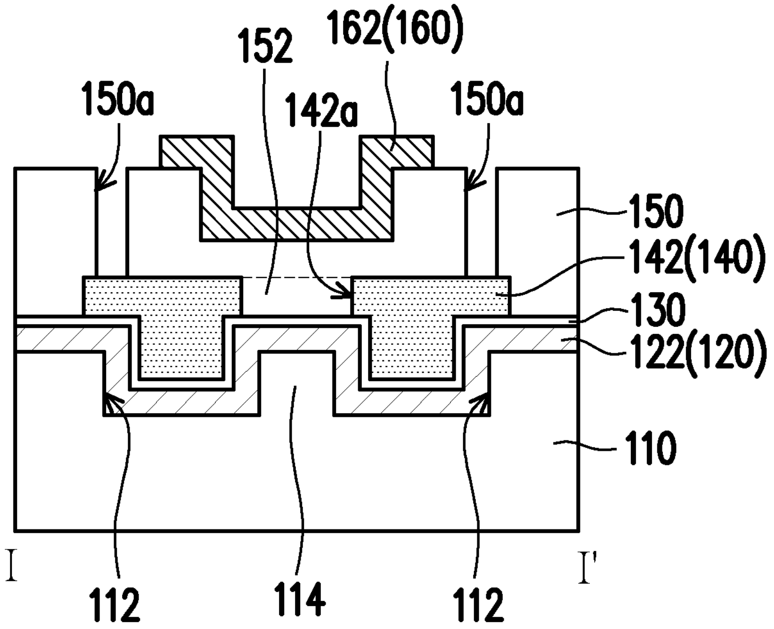
Figure 1H:
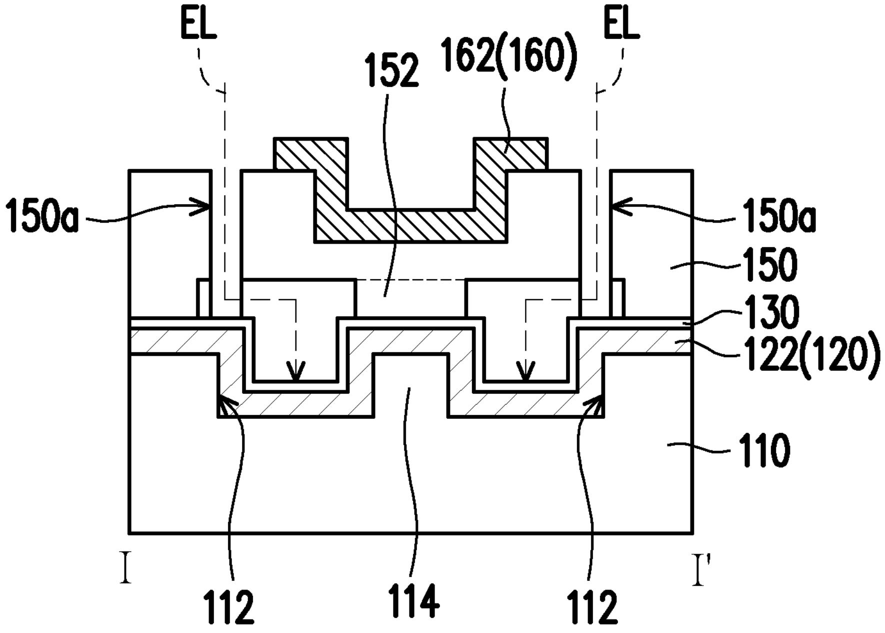
Figure 1I:
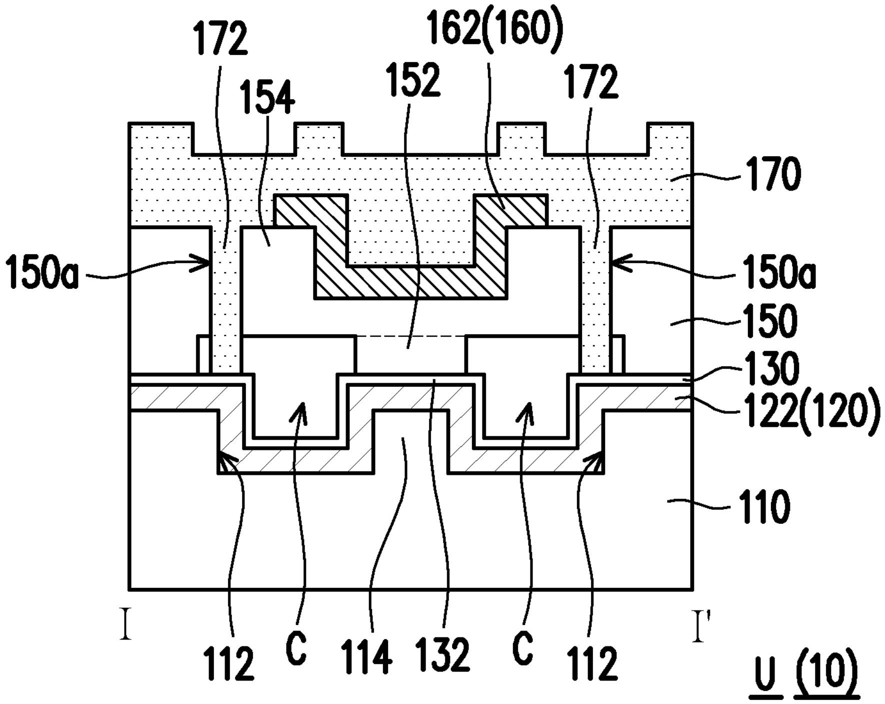
Figure 2I:
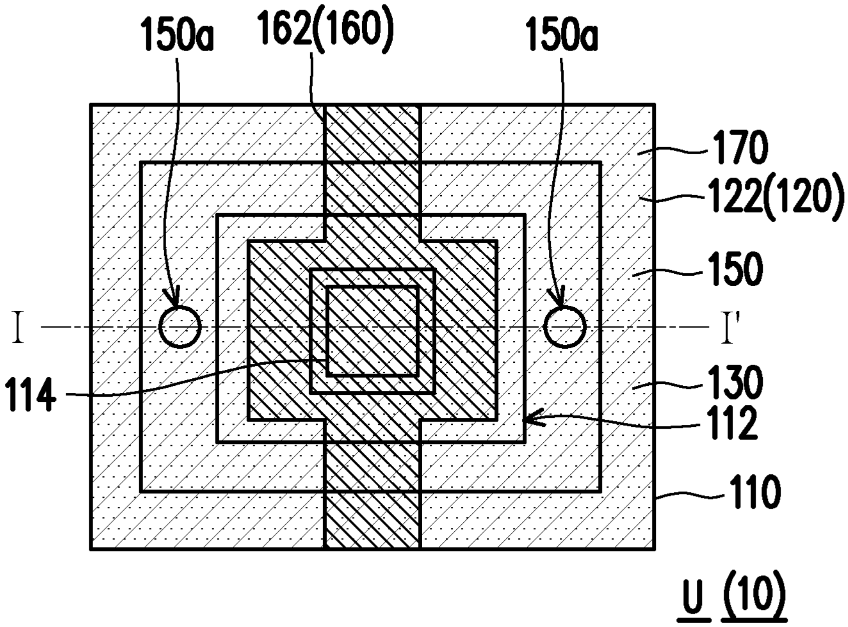

Referring to FIG. 1I and FIG. 2I, then, an encapsulation layer 170 is formed on the oscillating membrane 150. The encapsulation layer 170 includes multiple sealing portions 172. The sealing portions 172 are respectively disposed in the through holes 150*a* of the oscillating membrane 150 and extend to the insulating layer 130. The transducer 10 of this embodiment is completed. In this embodiment, the material of the encapsulation layer 170 may be an inorganic material (e.g., silicon nitride, silicon oxide, silicon oxynitride, or a stacked layer of at least two of the above materials), an organic material, or a combination of the above.

Figure 3:
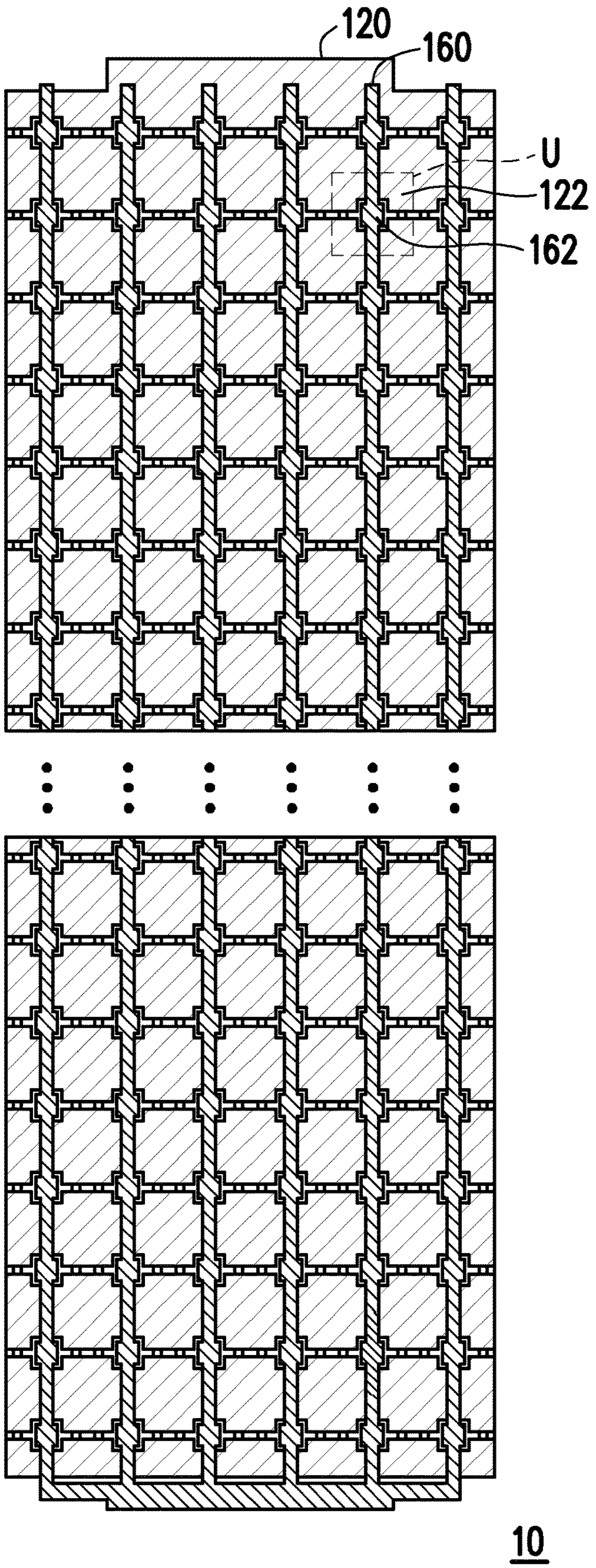
FIG. 3 is a top schematic view of a transducer according to an embodiment of the disclosure.

FIG. 3 is a top schematic view of a transducer according to an embodiment of the disclosure. Referring to FIG. 1I, FIG. 2I, and FIG. 3, the transducer 10 includes multiple transducer structures U. The lower electrodes 122 of the transducer structures U of the transducer 10 are electrically connected to each other. The upper electrodes 162 of the transducer structures U of the transducer 10 are electrically connected to each other.

Referring to FIG. 1I and FIG. 2I, each of the transducer structures U includes a substrate 110, a lower electrode 122, an insulating layer 130, an oscillating membrane 150, and an upper electrode 162. The substrate 110 has a cave 112 and an island-shaped protrusion 114 defining the cave 112. The lower electrode 122 is disposed in the cave 112 and on the island-shaped protrusion 114 of the substrate 110. The insulating layer 130 is disposed on the lower electrode 122. In one embodiment, the lower electrode 122 is conformally disposed in the cave 112 and on the island-shaped protrusion 114 of the substrate 110, and the insulating layer 130 is conformally disposed on the lower electrode 122. The oscillating membrane 150 includes a contact portion 152 and an oscillating portion 154. The contact portion 152 is in contact with the insulating layer 130 and is located between the oscillating portion 154 and the insulating layer 130. A cavity C is located between the oscillating portion 154 and the cave 112 of the substrate 110. The upper electrode 162 is disposed on the oscillating membrane 150. Each of the transducer structures U further includes an encapsulation layer 170. The encapsulation layer 170 includes multiple sealing portions 172. The sealing portions 172 are respectively disposed in the through holes 150*a* of the oscillating membrane 150 and extend to the insulating layer 130.

In one embodiment, the contact portion 152 of the oscillating membrane 150 overlaps the island-shaped protrusion 114 of the substrate 110. In one embodiment, the insulating layer 130 has a portion 132 disposed on the island-shaped protrusion 114 of the substrate 110, and the contact portion 152 of the oscillating membrane 150 is fixed to the portion 132 of the insulating layer 130. In one embodiment, the upper electrode 162 overlaps at least one portion of the island-shaped protrusion 114 and the cave 112 of the substrate 110. In one embodiment, in a top view, at least one portion of the island-shaped protrusion 114 and the cave 112 of the substrate 110 is located between the through holes 150*a* of the oscillating membrane 150.

Referring to FIG. 1I, FIG. 2I, and FIG. 3, the contact portion 152 of the oscillating membrane 150 is in contact with the insulating layer 130 regardless of whether the lower electrode 122 and the upper electrode 162 of the transducer 10 are turned on by applying an electric signal. The transducer 10 is adapted for operation in a single collapse mode. That is, the electrical signal applied to the lower electrode 122 and the upper electrode 162 of the transducer 10 may include AC components but not necessarily DC components. Thus, in addition to the high coupling efficiency (high sound pressure/bandwidth/sensitivity) and flexible design options (wide frequency range_variable frequency) of conventional collapse mode transducers, the transducer 10 also has the advantage of low energy consumption.

What is claimed is:

1. A transducer, comprising:

a substrate, having a cave and an island-shaped protrusion defining the cave to form a first ring-shaped space surrounding the island-shaped protrusion;

a lower electrode, completely covering the first ring-shaped space of the cave and the island-shaped protrusion of the substrate;

an insulating layer, completely covering and disposed on the lower electrode;

an oscillating membrane, comprising:

a contact portion, fixed to a portion of the insulating layer, and overlapping and corresponding to the island-shaped protrusion of the substrate, wherein a second ring-shaped space of a cavity of the oscillating membrane surrounds the contact portion, and wherein the second ring-shaped space of the cavity of the oscillating membrane overlaps and corresponds to the first ring-shaped space of the cave of the substrate; and an oscillating portion, wherein the contact portion is in contact with the insulating layer and is located between the oscillating portion and the insulating layer, and a cavity of the transducer is located between the oscillating portion and the cave of the substrate; and an upper electrode overlapping and corresponding to the island-shaped protrusion of the substrate and the first ring-shaped space of the cave of the substrate, disposed on the oscillating membrane.

2. The transducer according to claim 1, wherein the oscillating membrane has a plurality of through holes, and the transducer further comprises:

an encapsulation layer having a plurality of sealing portions, wherein the sealing portions are respectively disposed in the through holes of the oscillating membrane and extended to the insulating layer;

in a top view of the transducer, at least one portion of the island-shaped protrusion and the cave is located between the through holes of the oscillating membrane.

3. A manufacturing method for a transducer, comprising:

forming a first conductive layer on a substrate, wherein the substrate has a cave and an island-shaped protrusion defining the cave to form a first ring-shaped space surrounding the island-shaped protrusion, the first conductive layer comprises a lower electrode, and the lower electrode completely covers the first ring-shaped space of the cave and the island-shaped protrusion of the substrate;

forming an insulating layer on the first conductive layer, wherein the insulating layer completely covers and is disposed on the lower electrode;

forming a sacrificial material layer on the insulating layer, wherein the sacrificial material layer comprises a sacrificial block disposed above the lower electrode, the sacrificial block has a through hole, and the through hole of the sacrificial block overlaps the island-shaped protrusion of the substrate;

forming an oscillating material membrane for covering the sacrificial material layer, wherein a portion of the oscillating material membrane is filled into the through hole of the sacrificial block and is in contact with the insulating layer;

forming a second conductive layer on the oscillating material membrane, wherein the second conductive layer comprises an upper electrode overlapping and corresponding to the island-shaped protrusion of the substrate and the first ring-shaped space of the cave of the substrate;

forming a plurality of through holes in the oscillating material membrane so that the oscillating material membrane forms an oscillating membrane, wherein the through holes of the oscillating membrane respectively expose several regions of the sacrificial block, and the upper electrode is disposed on the oscillating membrane;

causing an etchant to enter the through holes of the oscillating membrane for removing the sacrificial block, wherein the oscillating membrane comprises:

a contact portion fixed to a portion of the insulating layer, and overlapping and corresponding to the island-shaped protrusion of the substrate, wherein a second ring-shaped space of a cavity of the oscillating membrane surrounds the contact portion, and wherein the second ring-shaped space of the cavity of the oscillating membrane overlaps and corresponds to the first ring-shaped space of the cave of the substrate; and an oscillating portion, wherein the contact portion is in contact with the insulating layer and is located between the oscillating portion and the insulating layer, and a cavity of the transducer is located between the oscillating portion and the cave of the substrate; and forming an encapsulation layer on the oscillating membrane, wherein the encapsulation layer comprises a plurality of sealing portions, and the sealing portions are respectively disposed in the through holes of the oscillating membrane and extended to the insulating layer.

4. The manufacturing method for the transducer according to claim 3, wherein in a top view of the transducer, at least one portion of the island-shaped protrusion and the cave is located between the through holes of the oscillating membrane.

5. The transducer according to claim 1, wherein at least a portion of the lower electrode is filled into the cave of the substrate along sidewalls of the island-shaped protrusion, and at least a portion of the insulating layer is filled into the cave of the substrate.

6. The transducer according to claim 1, wherein at least a portion of the lower electrode is filled into the cave of the substrate to form a first concave top surface facing to the oscillating membrane, and at least a portion of the insulating layer is filled into the cave of the substrate to form a second concave top surface facing to the oscillating membrane.

* * * * *